United States Patent
Takeda

(12) 
(10) Patent No.: US 6,931,958 B2
(45) Date of Patent: Aug. 23, 2005

(54) APPARATUS FOR CONTROLLING FIRST AND SECOND BICYCLE TRANSMISSIONS

(75) Inventor: Kazuhiro Takeda, Sakai (JP)

(73) Assignee: Shimaro, Inc., Sakai (JP)

( * ) Notice: Subject to any disclaimer, the term of this patent is extended or adjusted under 35 U.S.C. 154(b) by 0 days.

(21) Appl. No.: 10/227,108

(22) Filed: Aug. 23, 2002

(65) Prior Publication Data

US 2004/0035233 A1 Feb. 26, 2004

(51) Int. Cl.[7] .......................... F16H 59/00; G06F 17/00
(52) U.S. Cl. .......................... 74/336 R; 474/70; 701/52
(58) Field of Search .................. 477/97, 15; 74/335, 74/336 R; 474/58; 701/52, 62, 66

(56) References Cited

U.S. PATENT DOCUMENTS

| | | | | |
|---|---|---|---|---|
| 4,850,939 A | * | 7/1989 | Chilcote et al. | 474/49 |
| 5,213,548 A | * | 5/1993 | Colbert et al. | 474/71 |
| 6,047,230 A | * | 4/2000 | Spencer et al. | 701/57 |

* cited by examiner

Primary Examiner—Tisha Lewis
(74) Attorney, Agent, or Firm—James A. Deland

(57) ABSTRACT

A transmission control unit that generates transmission commands for controlling the operation of the first transmission and the second transmission. The transmission control unit includes an inhibiting unit for inhibiting a second operation of the first transmission after a first operation of the first transmission.

51 Claims, 4 Drawing Sheets

APPARATUS FOR CONTROLLING FIRST AND SECOND BICYCLE TRANSMISSIONS

BACKGROUND OF THE INVENTION

The present invention is directed to bicycle control devices and, more particularly, to features of an apparatus for shifting a bicycle transmission.

Electrically controlled bicycles usually include a front transmission associated with the front pedal assembly, a rear transmission associated with the rear wheel, a motor for each transmission, a control unit for controlling each motor, and a shift control device such as a lever or switch that provides electrical shift command signals to the control unit. The control unit operates the motors for each transmission based on the electrical signals received from the shift control device. In known electrically controlled bicycles, the transmission increases or decreases only one speed stage or gear for each shift command received from the shift control device, and the front or rear transmission operates at least once for each shift command. This can substantially delay the speed change operation and create considerable mechanical noise and wear on the components if the rider wants to shift multiple speed stages at one time.

SUMMARY OF THE INVENTION

The present invention is directed to various features of an apparatus for shifting a bicycle transmission. In one embodiment of an invention that may be used for controlling a first transmission and a second transmission in a bicycle, an inventive apparatus includes a transmission control unit that generates transmission commands for controlling the operation of the first transmission and the second transmission. The transmission control unit includes an inhibiting unit for inhibiting a second operation of the first transmission after a first operation of the first transmission. If desired, such inhibiting could be triggered based on the operation of the first transmission, by a change in operating mode (such as from a manual mode of operation to an automatic mode of operation), or by some other criteria.

DETAILED DESCRIPTION OF THE EMBODIMENTS

Figure 1:
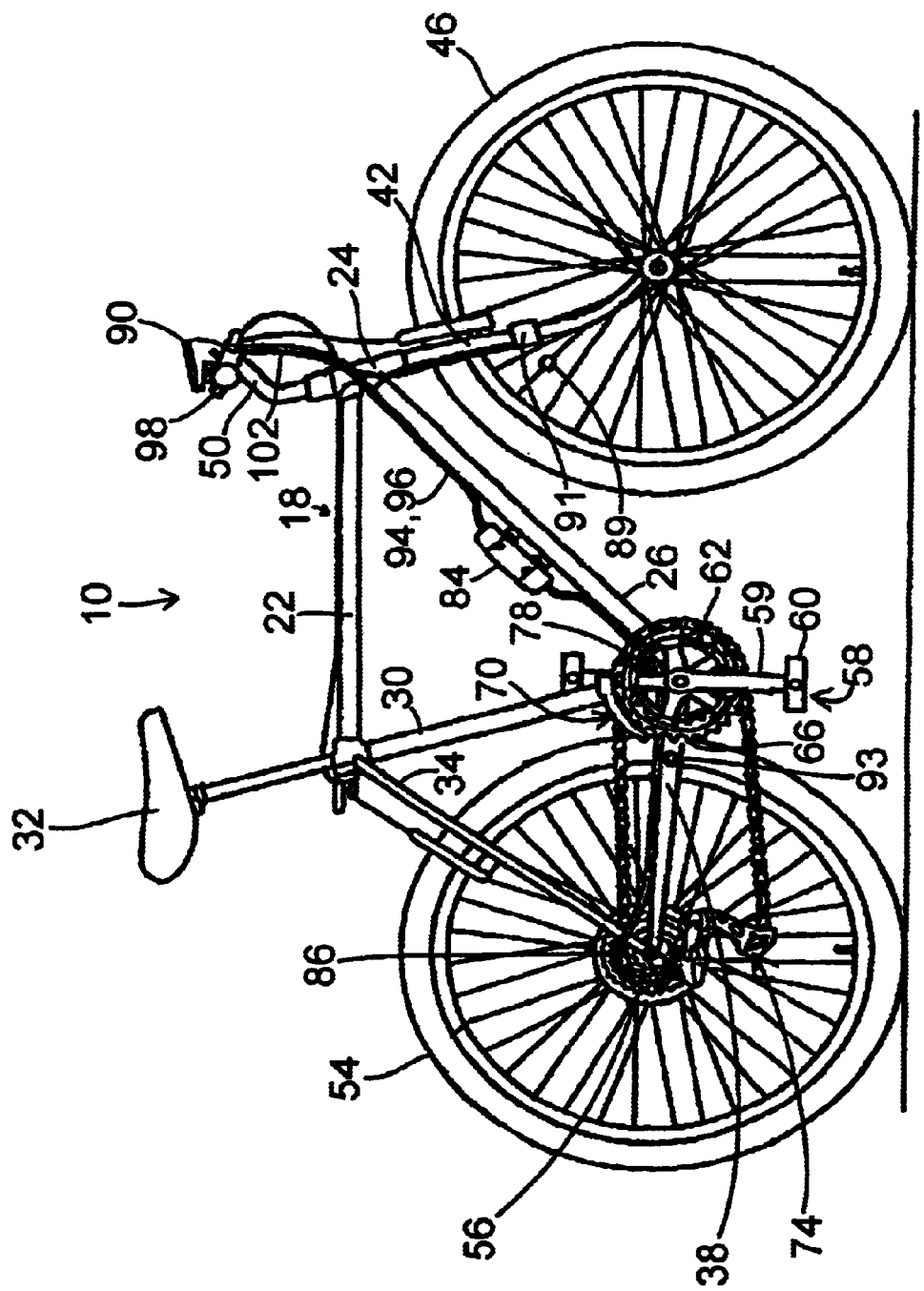
FIG. 1 is a side view of a bicycle that includes a particular embodiment of an apparatus for shifting a bicycle transmission.

FIG. 1 is a side view of a bicycle 10 that incorporates a particular embodiment of an apparatus for shifting a bicycle transmission. Bicycle 10 may be any type of bicycle, and in this embodiment bicycle 10 includes a typical frame 18 comprising a top tube 22, a head tube 24, a down tube 26 extending downwardly from head tube 24, a seat tube 30 supporting a seat 32 and extending downwardly from top tube 22, a bottom bracket (not shown) disposed at the junction of down tube 26 and seat tube 30, a pair of seatstays 34 extending rearwardly and downwardly from top tube 22, and a pair of chainstays 38 extending rearwardly from the bottom bracket. A fork 42 is rotatably supported within head tube 24, and a front wheel 46 is rotatably supported to the lower end of fork 42. Handlebars 50 control the rotational direction of fork 42 and front wheel 46 in a well-known manner. A rear wheel 54 having a plurality of coaxially mounted rear (freewheel) sprockets 56 is rotatably supported at the junction of seatstays 34 and chainstays 38, and a pedal assembly 58 supporting a plurality of front (chainwheel) sprockets 62 is rotatably supported within the bottom bracket. Typically, two or three front sprockets 62 rotate coaxially and integrally with pedal assembly 58. Pedal assembly 58 includes a pair of crank arms 59, each of which has a pedal 60 mounted to its distal end. A chain 66 engages one of the front sprockets 62 and one of the rear sprockets 56. A front derailleur 70 moves chain 66 from one front sprocket 62 to another, and a rear derailleur 74 moves chain 66 from one rear sprocket 56 to another. These operations are well known.

In this embodiment, front derailleur 70 is controlled by pulling and releasing a conventional Bowden-type control cable 78 coupled to a front derailleur motor 82 (FIG. 2) disposed in a motor assembly 84, and rear derailleur 74 is controlled by pulling and releasing a Bowden-type control cable 86 coupled to a rear derailleur motor 93 disposed in motor assembly 84. Of course, in some embodiments a single motor may be coupled to separate cable pulling structures through clutches or otherwise to perform the same function, and such also could be deemed distinct motors. A front derailleur position sensor 87 and a rear derailleur position sensor 88 are provided for sensing the operational positions of the front and rear derailleurs 70 and 74, respectively. These position sensors provide signals that determine which front sprocket 62 and rear sprocket 56 is currently engaged by chain 66. Such position sensors may comprise, for example, known potentiometers for sensing the positions of the output shafts of front derailleur motor 82 and rear derailleur motor 93, but there are many other known structures that can perform these functions. A speed sensor 91 is mounted to fork 42 for receiving signals from a magnet 89 mounted to front wheel 46 for sensing the speed of the bicycle in a well-known manner, and a crank rotation sensor 92 (FIG. 2) is mounted to pedal assembly 58 for providing signals indicating the rotation of crank arms 59. In this embodiment, four signals are provided for each revolution of crank arms 59. Such signals may be provided using an optical wheel that rotates with pedal assembly 58, by a magnetic wheel having four magnets, or by some other device.

Figure 2:
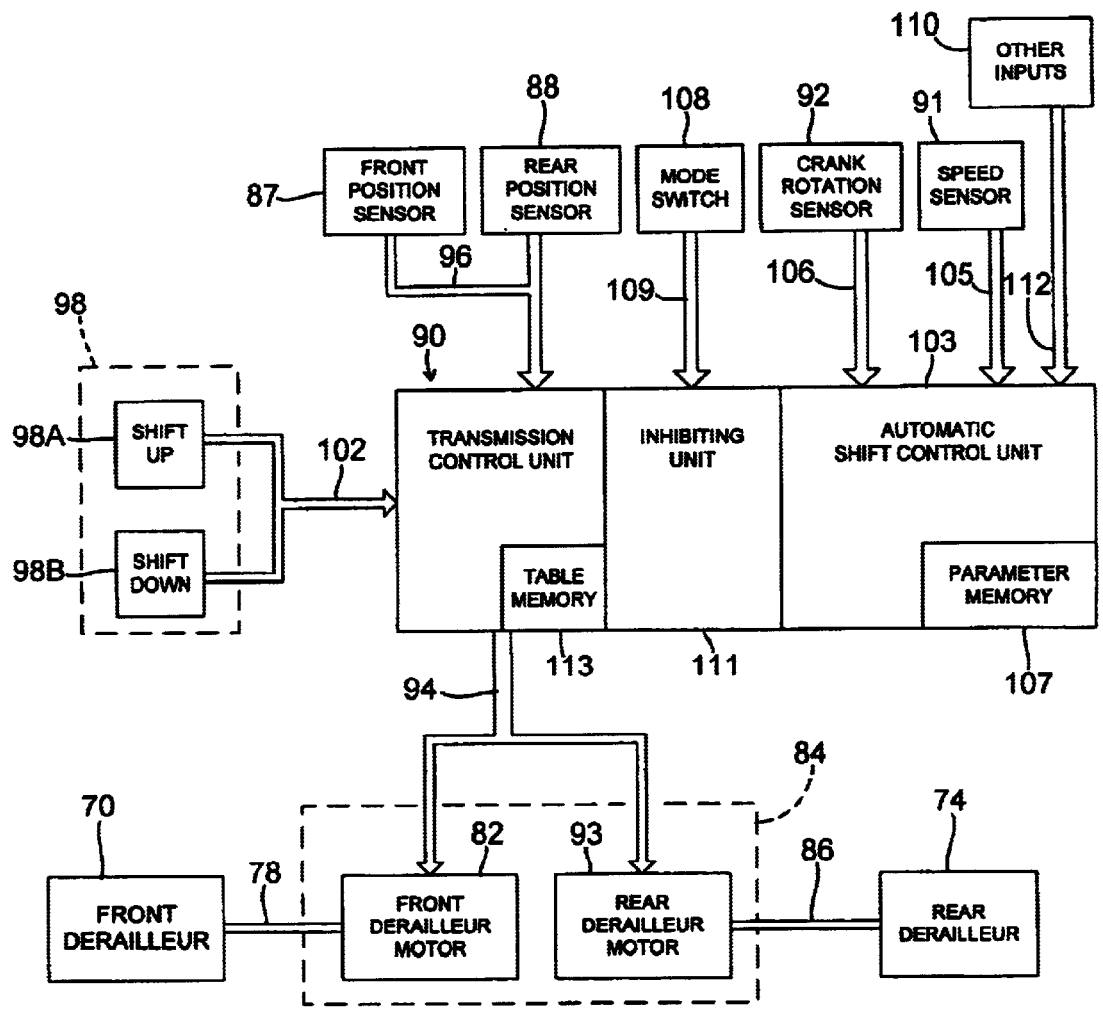
FIG. 2 is a block diagram of a particular embodiment of the apparatus for shifting a bicycle transmission.

As shown more clearly in FIG. 2, a transmission control unit 90 is operatively coupled to motor assembly 84 through a transmission command communication path 94 and to position sensors 87 and 88 through a transmission position communication path 96 for generating transmission command (TC) signals for controlling the operation of motor assembly 84 in accordance with the information from position sensors 87 and 88. A manually operated shift command unit 98, comprising a shift-up switch 98A and a shift-down switch 98B, is operatively coupled to transmission control unit 90 through a shift command communication path 102 for communicating electrical shift commands (described in more detail below) to transmission control unit 90.

Transmission control unit 90 further includes an automatic shift control unit 103 that uses the signals received from position sensors 87 and 88 over transmission position communication path 96, the signals received from speed sensor 91 over a speed communication path 105 and the signals received from crank rotation sensor 92 over a crank rotation communication path 106 to automatically generate the TC signals (based on internally generated and processed shift commands). Automatic shift control unit 103 includes a parameter memory 107 for storing wheel circumference, crank rotation tables, speed tables and/or acceleration tables for generating TC signals based on crank rotation, speed and/or acceleration in accordance with known programming techniques. Parameter memory 107 may be a hardware table memory, a software table memory, or some other structure that provides the same information. Transmission control unit 90 also includes an inhibiting unit 111 for inhibiting the generation of TC signals that operate front derailleur 70 in a manner described below. A mode switch 108 is operatively coupled to transmission control unit 90 through a mode communication path 109 to select between the automatic and manual modes of operation.

Other inputs 110 may be operatively coupled to transmission control unit 90 through a communication path 112 for communicating other information such as from a heart rate sensor, a slope sensor, a pedal or other torque sensor, etc. Parameter memory 107 and the programming of automatic shift control unit 103 may be configured accordingly to generate TC signals in accordance with these other inputs in any combination. Of course, in some embodiments transmission control unit 90 may operate only manually, and in other embodiments transmission control unit 90 may operate only automatically. In this embodiment, communication paths 94, 96, 102, 105, 106 and 109 have the form of electrical wires, but in other embodiments such communication paths may comprise fiber optic devices, wireless communication paths, or some other mechanism.

When the transmission control unit 90 receives at least one shift command requesting a shift through N speed stages to a destination speed stage, wherein N is an integer greater than one, transmission control unit 90 generates TC signals (digital or analog) for causing front derailleur 70 and rear derailleur 74 in combination to move a total of M times to reach the destination speed stage, wherein M is an integer less than N. To accomplish this, transmission control unit 90 comprises a table memory 113 for storing a table containing the information for controlling the operation of front derailleur 70 and rear derailleur 74. Table memory 113 may be a hardware table memory, a software table memory, or some other structure that provides the same information. The content of table memory 113 depends upon the configuration of the bicycle. Three examples will be provided below, and other configurations will be readily apparent to one of ordinary skill in the art.

Figure 3A:
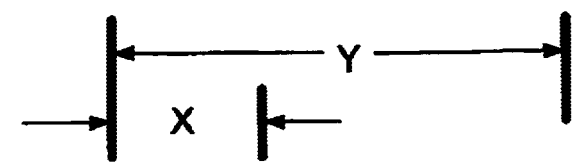
FIG. 3A is a timing diagram illustrating a possible electrical shift command signal received by the control unit shown in FIG. 2.
Figure 3B:
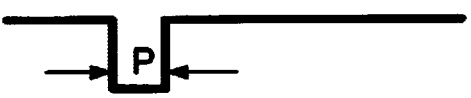
FIG. 3B is a timing diagram illustrating another possible electrical shift command signal received by the control unit shown in FIG. 2.
Figure 3C:
FIG. 3C is a timing diagram illustrating another possible electrical shift command signal received by the control unit shown in FIG. 2.

FIGS. 3A–3E are timing diagrams indicating various embodiments of shift commands generated by shift control unit 98 and the timing of TC signals generated by transmission control unit 90. In each diagram, the shift command signals are low active. FIG. 3A illustrates a situation wherein a shift command signal is generated by shift control device 98 for a time interval P that is less than a predetermined time interval X. In this embodiment, such a shift command signal is assumed to be a spurious signal, and no operation is performed. Of course, in other embodiments such a shift command signal could perform some kind of function. FIG. 3B illustrates a situation wherein a shift command signal is generated by shift control device 98 for a time interval Q that is greater than time interval X. In this embodiment, such a shift command signal requests a shift by one speed stage, and the TC signal is generated accordingly. FIG. 3C illustrates a situation wherein a shift command signal is generated by shift control device 98 for a time interval R that is greater than time interval X and also greater than a time interval Y, wherein, for the purposes of measurement, time interval Y begins at the same instant as time interval X but is greater than time interval X. In this embodiment, such a shift command signal requests a shift by two speed stages, and the TC signal is generated accordingly.

Figure 3D:
FIG. 3D is a timing diagram illustrating a possible composite electrical shift command signal received by the control unit shown in FIG. 2.
Figure 3E:
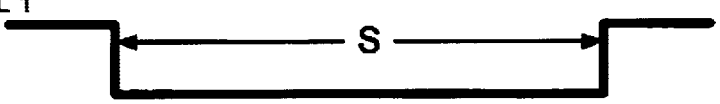
FIG. 3E is a timing diagram illustrating another possible composite electrical shift command signal received by the control unit shown in FIG. 2.
Figure 3E:
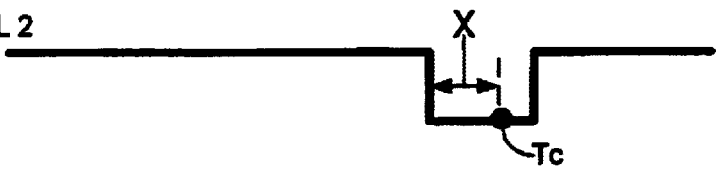
Figure 3E:

FIG. 3D illustrates a situation wherein a composite shift command signal appearing on two channels is generated by shift control device 98. In this example, the shift command signal appearing on channel 1 is generated for a time interval S that is greater than time interval X. A shift command signal is generated on channel 2 prior to the expiration of time interval Y. In this embodiment, such a composite shift command signal requests a shift by two speed stages, and the TC signal is generated accordingly. Such a composite signal could be generated by two separately operated switches, but in most cases it would be more convenient to generate such signals by a plunger with an electrical contact which successively and cumulatively contacts two other electrical contacts. Such a switch also could be used to generate the signal shown in FIGS. 3A–3C by depressing the plunger only enough to activate one of the two other electrical contacts. Of course, many ways of generating such signals could be devised. FIG. 3E illustrates a situation wherein sequential shift command signals are generated by shift control device 98. In this example, two sequential shift command signals are generated within a time interval T of each other. Such an action is similar to double-clicking a computer mouse. In this embodiment, such sequential shift command signals request a shift by two speed stages, and the TC signal is generated accordingly. Each shift-up switch 98A and shift-down switch 98B may use any of the techniques illustrated in FIGS. 3A–3E to suit the application.

Table 1 illustrates a bicycle with two front sprockets 62 and eight rear sprockets 56, and Table 2 illustrates the shift commands and TC signals for operating front derailleur 70 and rear derailleur 74 for this configuration. Transmission control unit 90 is programmed, whether through hardwired logic, software or otherwise to generate the appropriate TC signals on communication path 94 in response to the indicated shift command.

TABLE 1

| | | Rear Sprocket | | | | | | | |
|---|---|---|---|---|---|---|---|---|---|
| | Teeth | 11 | 13 | 15 | 17 | 21 | 25 | 29 | 33 |
| Front Sprocket | 46 | 4.18 | 3.54 | 3.07 | 2.71 | 2.19 | 1.84 | 1.59 | 1.39 |
| | 34 | 3.09 | 2.62 | 2.27 | 2.00 | 1.62 | 1.36 | 1.17 | 1.03 |

TABLE 2

| Present Gear Position | | Signal Recognized By Control Unit | | | |
|---|---|---|---|---|---|
| | | Two Steps | One Step | Two Steps | One Step |
| Front | Rear | Up | Up | Down | Down |
| 46 | 11 | Alarm | Alarm | front − 1 | rear − 1 |
| 46 | 13 | rear + 1 | rear + 1 | front − 1 | rear − 1 |
| 46 | 15 | rear + 2 | rear + 1 | front − 1 | rear − 1 |
| 46 | 17 | rear + 2 | rear + 1 | front − 1 | rear − 1 |
| 46 | 21 | rear + 2 | rear + 1 | front − 1 | rear − 1 |
| 46 | 25 | rear + 2 | rear + 1 | front − 1 | rear − 1 |
| 46 | 29 | rear + 2 | rear + 1 | front − 1 | rear − 1 |
| 46 | 33 | rear + 2 | rear + 1 | front − 1 | front − 1 rear + 1 |
| 34 | 11 | front + 1 | front + 1, rear − 1 | rear − 2 | rear − 1 |
| 34 | 13 | front + 1 | rear + 1 | rear − 2 | rear − 1 |
| 34 | 15 | front + 1 | rear + 1 | rear − 2 | rear − 1 |
| 34 | 17 | front + 1 | rear + 1 | rear − 2 | rear − 1 |
| 34 | 21 | front + 1 | rear + 1 | rear − 2 | rear − 1 |
| 34 | 25 | front + 1 | rear + 1 | rear − 2 | rear − 1 |
| 34 | 29 | front + 1 | rear + 1 | rear − 1 | rear − 1 |
| 34 | 33 | front + 1 | rear + 1 | Alarm | Alarm |
| | | | Speed Stage | | |

Table 3 illustrates a bicycle with three front sprockets 62 and eight rear sprockets 56, and Table 4 illustrates the shift commands and TC signals for operating front derailleur 70 and rear derailleur 74 for this configuration.

TABLE 3

| | | Rear Sprocket | | | | | | | |
|---|---|---|---|---|---|---|---|---|---|
| | Teeth | 11 | 13 | 15 | 17 | 21 | 25 | 29 | 33 |
| Front Sprocket | 46 | 4.18 | 3.54 | 3.07 | 2.71 | 2.19 | 1.84 | 1.59 | 1.39 |
| | 34 | 3.09 | 2.62 | 2.27 | 2.00 | 1.62 | 1.36 | 1.17 | 1.03 |
| | 24 | 2.18 | 1.85 | 1.60 | 1.41 | 1.14 | 0.96 | 0.83 | 0.73 |

TABLE 4

| Present Gear Position | | Signal Recognized By Computer | | | |
|---|---|---|---|---|---|
| | | Two Steps | One Step | Two Steps | One Step |
| Front | Rear | Up | Up | Down | Down |
| 46 | 11 | Alarm | Alarm | front − 1 | rear − 1 |
| 46 | 13 | rear + 1 | rear + 1 | front − 1 | rear − 1 |
| 46 | 15 | rear + 2 | rear + 1 | front − 1 | rear − 1 |
| 46 | 17 | rear + 2 | rear + 1 | front − 1 | rear − 1 |
| 46 | 21 | rear + 2 | rear + 1 | front − 1 | rear − 1 |
| 46 | 25 | rear + 2 | rear + 1 | front − 1 | rear − 1 |
| 46 | 29 | rear + 2 | rear + 1 | front − 1 | rear − 1 |
| 46 | 33 | rear + 2 | rear + 1 | front − 1 | front − 1 rear + 1 |
| 34 | 11 | front + 1 | front + 1, rear − 1 | front − 1 | rear − 1 |
| 34 | 13 | front + 1 | rear + 1 | front − 1 | rear − 1 |
| 34 | 15 | front + 1 | rear + 1 | front − 1 | rear − 1 |
| 34 | 17 | front + 1 | rear + 1 | front − 1 | rear − 1 |
| 34 | 21 | front + 1 | rear + 1 | front − 1 | rear − 1 |
| 34 | 25 | front + 1 | rear + 1 | front − 1 | rear − 1 |
| 34 | 29 | front + 1 | rear + 1 | front − 1 | rear − 1 |
| 34 | 33 | front + 1 | rear + 1 | front − 1 | front − 1, rear + 1 |
| 24 | 11 | front + 1 | front + 1, rear − 1 | rear − 2 | rear − 1 |
| 24 | 13 | front + 1 | rear + 1 | rear − 2 | rear − 1 |
| 24 | 15 | front + 1 | rear + 1 | rear − 2 | rear − 1 |
| 24 | 17 | front + 1 | rear + 1 | rear − 2 | rear − 1 |
| 24 | 21 | fraon + 1 | rear + 1 | rear − 2 | rear − 1 |
| 24 | 25 | front + 1 | rear + 1 | rear − 2 | rear − 1 |
| 24 | 29 | front + 1 | rear + 1 | rear − 1 | rear − 1 |
| 24 | 33 | front + 1 | rear + 1 | Alarm | Alarm |
| | | | Speed Stage | | |

Table 5 illustrates the shift commands and TC signals for operating front derailleur 70 and rear derailleur 74 for the same configuration when implementing the concept of a prohibited range of sprocket combinations. Such prohibited sprocket combinations typically comprise the combination of the large front sprocket with the large rear sprockets, which results in excessive chain tension, and the small front sprocket with the small rear sprockets, which results in excessive chain looseness.

TABLE 5

| Present Gear Position | | Signal Recognized By Computer | | | |
|---|---|---|---|---|---|
| | | Two Steps | One Step | Two Steps | One Step |
| Front | Rear | Up | Up | Down | Down |
| 46 | 11 | Alarm | Alarm | front − 1 | rear − 1 |
| 46 | 13 | rear + 1 | rear + 1 | front − 1 | rear − 1 |
| 46 | 15 | rear + 2 | rear + 1 | front − 1 | rear − 1 |
| 46 | 17 | rear + 2 | rear + 1 | front − 1 | rear − 1 |
| 46 | 21 | rear + 2 | rear + 1 | front − 1 | front − 1, rear + 1 |
| 46 | 25 | Prohibited | Prohibited | Prohibited | Prohibited |
| 46 | 29 | Prohibited | Prohibited | Prohibited | Prohibited |
| 46 | 33 | Prohibited | Prohibited | Prohibited | Prohibited |
| 34 | 11 | front + 1 | front + 1, rear − 1 | rear − 2 | rear − 1 |
| 34 | 13 | front + 1 | rear + 1 | rear − 2 | rear − 1 |
| 34 | 15 | front + 1 | rear + 1 | rear − 2 | rear − 1 |
| 34 | 17 | front + 1 | rear + 1 | front − 1 | rear − 1 |
| 34 | 21 | front + 1 | rear + 1 | front − 1 | rear − 1 |
| 34 | 25 | rear + 2 | rear + 1 | front − 1 | rear − 1 |
| 34 | 29 | rear + 2 | rear + 1 | front − 1 | rear − 1 |
| 34 | 33 | rear + 2 | rear + 1 | front − 1 | front − 1, rear + 1 |
| 24 | 11 | Prohibited | Prohibited | Prohibited | Prohibited |
| 24 | 13 | Prohibited | Prohibited | Prohibited | Prohibited |
| 24 | 15 | Prohibited | Prohibited | Prohibited | Prohibited |
| 24 | 17 | front + 1 | front + 1, rear − 1 | rear − 2 | rear − 1 |
| 24 | 21 | front + 1 | rear + 1 | rear − 2 | rear − 1 |
| 24 | 25 | front + 1 | rear + 1 | rear − 2 | rear − 1 |
| 24 | 29 | front + 1 | rear + 1 | rear − 1 | rear − 1 |
| 24 | 33 | front + 1 | rear + 1 | Alarm | Alarm |
| | | | Speed Stage | | |

In all examples, it should be noticed that some shift commands that request a change through two speed stages require only one movement of one derailleur. For example, assume in the first configuration that chain 66 is disposed on the 34-tooth front sprocket 62 and the 33-tooth rear sprocket 56, thus producing a speed stage having a gear ratio of 1.03. If shift control device 98 (or automatic shift control unit 103) generates a signal indicating a two-step-up shift command (two sequential gear ratios), then transmission control unit 90 may generate a TC signal to move front derailleur 70 a single step so that chain 66 engages the 46-tooth front sprocket 62, thus producing the speed stage having a gear ratio of 1.39. Prior art electrically controlled bicycles would move rear derailleur 74 from the 33-tooth rear sprocket 56 to the 29-tooth rear sprocket 56, and then to the 25-tooth rear sprocket 56, thus producing the speed stage having a gear ratio of 1.36. Such a technique requires a total of two movements, rather than the one movement taught herein.

The foregoing method and apparatus takes advantage of the fact that many front/rear sprocket combinations produce substantially the same gear ratio. The TC signals are generated based on which combination of front and rear sprockets require the least number of movements of the front derailleur 70 and/or rear derailleur 74 to achieve the desired gear ratio. In general, particularly good results can be achieved by selecting the front and rear sprockets such that, for a given combination of front and rear sprockets, the change in gear ratio that results when switching from one front sprocket to another front sprocket is substantially an integral number of the change in gear ratio when switching from one rear sprocket to another rear sprocket. In the embodiment disclosed above, the change in gear ratio that results when switching from one front sprocket to another front sprocket is substantially twice the change in gear ratio when switching from one rear sprocket to another rear sprocket. If a shift command signal is received that cannot be accommodated, such as a shift-up command to when the chain 66 currently engages the largest front sprocket 62 and the smallest rear sprocket 56, then table memory 113 can instruct the system to sound an audible alarm indicating an illegal request. In such a situation front derailleur 70 and rear derailleur 74 remain stationary.

Figure 4:
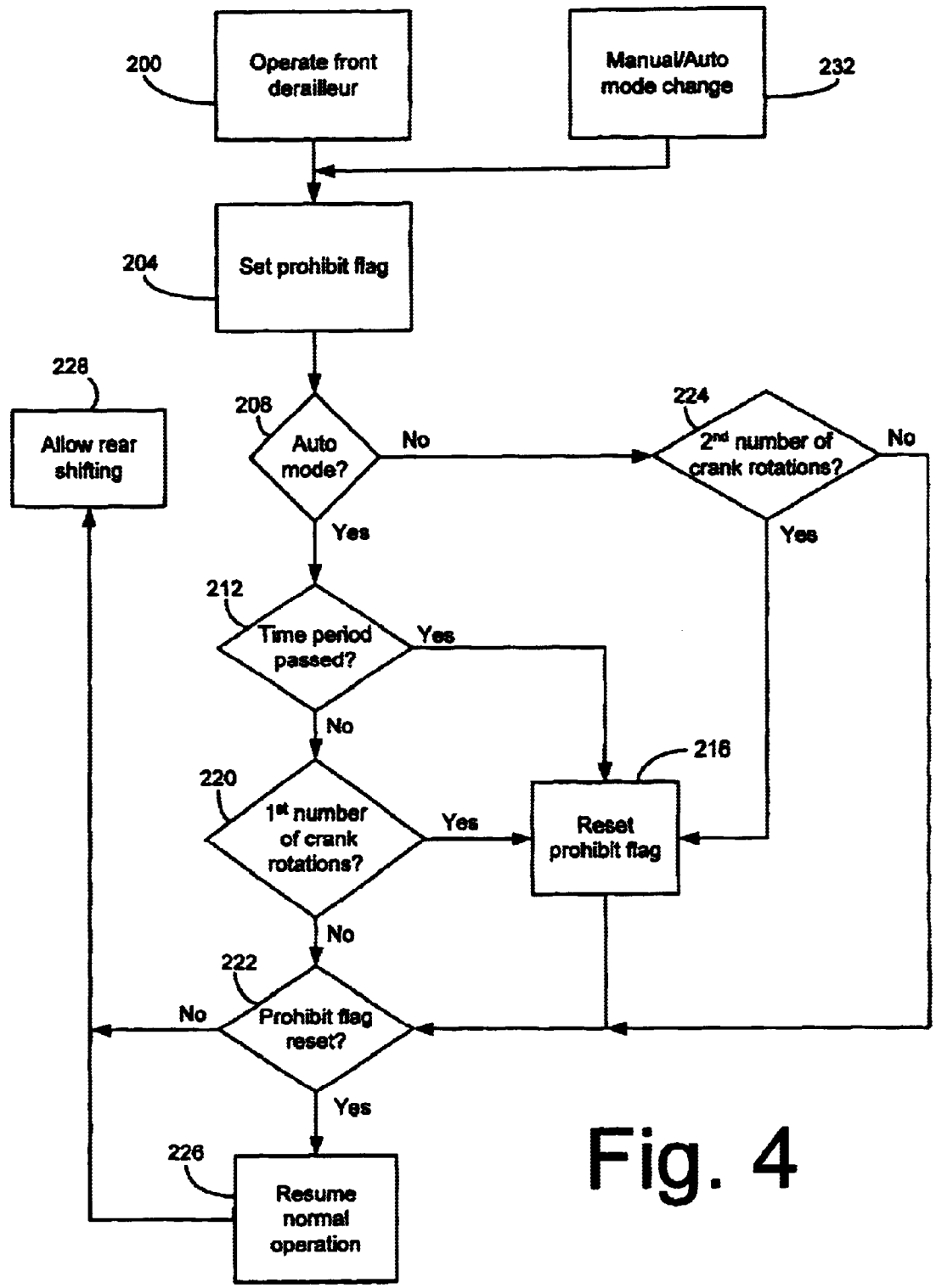
FIG. 4 is a flow chart illustrating how the apparatus inhibits successive shifting of the front derailleur.

It may be desirable to prevent multiple and rapid successive shifting of front derailleur 70, either manually or automatically, to avoid excessive speed changing shocks to the rider. Transmission control unit 90 includes inhibiting unit 111 to prevent this from happening. In general, inhibiting unit 111 may inhibit successive operation of front derailleur 70 based on predetermined time intervals or by the number of revolutions of a rotating member such as crank arms 59. FIG. 4 is a flow chart showing the operation of inhibiting unit 111. Assume transmission control unit 90 operates front derailleur 70 in a step 200. Inhibiting unit 111 sets a shift prohibit flag in a step 204 that prohibits further generation of TC commands to operate front derailleur 70. It is then ascertained in a step 208 whether transmission control unit 90 is operating in automatic mode or in manual mode as set by mode switch 108. If it is determined that transmission control unit 90 is in automatic mode, it is then ascertained in a step 212 whether a prescribed time interval has passed since the last time front derailleur 70 was operated. In this embodiment, the prescribed time interval is 15 seconds. If the prescribed time interval has passed, then inhibiting unit 111 resets the shift prohibit flag in a step 216 to cancel the prohibition. However, if it is ascertained in step 212 that the prescribed time interval has not passed, then it is ascertained in a step 220 whether a first prescribed number of crank rotation signals has been received since the last time front derailleur 70 was operated. In this embodiment, it is desirable to prohibit further shifting of front derailleur 70 for about 3.5 rotations of crank arms 59 when operating in automatic mode (for reasons discussed below), so the first prescribed number of crank rotation signals is set to 14 (3.5×4). If the first prescribed number of crank rotation signals has been received, then inhibiting unit 111 resets the shift prohibit flag in step 216. Otherwise, processing continues in step 222.

If it is determined in step 208 that transmission control unit 90 is operating in manual mode, it is then ascertained in a step 224 whether a second prescribed number of crank rotation signals has been received since the last time front derailleur 70 was operated. In this embodiment, it is desirable to prohibit further shifting of front derailleur 70 for about one rotation of crank arms 59 when operating in manual mode (for reasons discussed below), so the second prescribed number of crank rotation signals is set to four. If the second prescribed number of crank rotation signals has been received, then inhibiting unit 111 resets the shift prohibit flag in step 216, and processing continues in step 222.

It is ascertained in step 222 whether the shift prohibit flag has been reset. If so, then normal processing resumes in a step 226, and transmission control unit 90 will operate front derailleur 70 as needed. However, if it is determined that the shift prohibit flag is still set, then any shifting of rear derailleur 74 that may be used to obtain the desired gear is allowed in a step 228, but processing continues in step 208. In other words, in this embodiment, it is preferable to have rear derailleur 74 absorb the gear ratio difference between the currently set gear and the desired gear, even if it involves rapid successive operation of rear derailleur 74, than to have rapid successive operation of front derailleur 70. The inhibiting depends on the number of times the rear derailleur may need to move (determined empirically), the number of shift facilitating structures (such as those disclosed in U.S. Pat. No. 4,889,521) disposed around each rear sprocket, and the current crank rotational speed. That is why, in this embodiment, the shift prohibit flag is set for 3.5 crank arm revolutions when operating in automatic mode, but only one crank arm revolution when operating in manual mode. Presumably the rider intends to have more control over shifting when operating in manual mode.

When changing from a manual mode of operation to an automatic mode of operation, it is possible that the gear that would be chosen automatically is very different from the currently selected gear. This also could result in rapid successive operation of front derailleur 70. Accordingly, the teachings of the present invention could be applied to such a mode change as shown by step 232 in FIG. 4 and subsequent steps. Thus, the inventive features noted above can be used in many applications.

While the above is a description of various inventive features, further modifications may be employed without departing from the spirit and scope of the present invention. For example, inhibits could be based on time alone or by some other factor such as the rider's heart rate, bicycle speed, and so on. The size, shape, location or orientation of the various components may be changed as desired. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. An apparatus for controlling a first transmission and a second transmission in a bicycle, wherein the apparatus comprises:

a transmission control unit that generates transmission commands for controlling the operation of the first transmission and the second transmission; and wherein the transmission control unit comprises an inhibiting unit for inhibiting a second operation of moving the first transmission from a second origin gear ratio to a second destination gear ratio after a first operation of moving the first transmission from a first origin gear ratio to a first destination gear ratio based on movement of the first transmission from the first origin gear ratio to the first destination gear ratio.

2. The apparatus according to claim 1 wherein the inhibiting unit inhibits the second operation of the first transmission for a prescribed time interval after the first operation of the first transmission.

3. The apparatus according to claim 1 wherein the transmission control unit is operatively coupled to a rotation information communication path for receiving information indicating rotation of a rotating member, and wherein the inhibiting unit inhibits the second operation of the first transmission based on rotation of the rotating member.

4. An apparatus for controlling a first transmission and a second transmission in a bicycle, wherein the apparatus comprises:
   a transmission control unit that generates transmission commands for controlling the operation of the first transmission and the second transmission;
   wherein the transmission control unit comprises an inhibiting unit for inhibiting a second operation of the first transmission after a first operation of the first transmission;
   wherein the transmission control unit is operatively coupled to a rotation information communication path for receiving information indicating rotation of a rotating member;
   wherein the inhibiting unit inhibits the second operation of the first transmission based on rotation of the rotating member;
   wherein the information indicating rotation of the rotating member comprises rotation indicating signals, and wherein the inhibiting unit inhibits the second operation of the first transmission until after receiving a prescribed number of rotation indicating signals.

5. The apparatus according to claim 4 wherein the rotation indicating signals comprise crank rotation indicating signals, and wherein the inhibiting unit inhibits the second operation of the first transmission until after receiving the prescribed number of crank rotation indicating signals.

6. The apparatus according to claim 1 wherein the transmission control unit further comprises an automatic shift control unit for automatically generating the transmission commands.

7. The apparatus according to claim 6 wherein the transmission control unit is operatively coupled to a speed communication path for receiving information indicating a bicycle speed, and wherein the transmission control unit automatically generates transmission commands based on bicycle speed.

8. The apparatus according to claim 6 wherein the automatic shift control unit operates in an automatic mode and in a manual mode.

9. An apparatus for controlling a first transmission and a second transmission in a bicycle, wherein the apparatus comprises:
   a transmission control unit that generates transmission commands for controlling the operation of the first transmission and the second transmission;
   wherein the transmission control unit comprises:
      an inhibiting unit for inhibiting a second operation of the first transmission after a first operation of the first transmission; and
      an automatic shift control unit for automatically generating the transmission commands;
   wherein the automatic shift control unit operates in an automatic mode and in a manual mode;
   wherein the transmission control unit is operatively coupled to a rotation information communication path for receiving information indicating rotation of a rotating member, and wherein, when the automatic shift control unit operates in the manual mode, the inhibiting unit inhibits the second operation of the first transmission based on rotation of the rotating member.

10. The apparatus according to claim 9 wherein the information indicating rotation of a rotating member comprises rotation indicating signals, and wherein, when the automatic shift control unit operates in the manual mode, the inhibiting unit inhibits the second operation of the first transmission until after receiving a prescribed number of rotation indicating signals.

11. The apparatus according to claim 10 wherein the rotation indicating signals comprise crank rotation indicating signals, and wherein, when the automatic shift control unit operates in the manual mode, the inhibiting unit inhibits the second operation of the first transmission until after receiving the prescribed number of crank rotation indicating signals.

12. The apparatus according to claim 8 wherein, when the automatic shift control unit operates in the automatic mode, the inhibiting unit inhibits the second operation of the first transmission for a prescribed time interval after the first operation of the first transmission.

13. The apparatus according to claim 8 wherein the transmission control unit is operatively coupled to a rotation information communication path for receiving information indicating rotation of a rotating member, and wherein, when the automatic transmission control unit operates in the automatic mode, the inhibiting unit inhibits the second operation of the first transmission based on rotation of the rotating member.

14. An apparatus for controlling a first transmission and a second transmission in a bicycle, wherein the apparatus comprises:
   a transmission control unit that generates transmission commands for controlling the operation of the first transmission and the second transmission;
   wherein the transmission control unit comprises:
      an inhibiting unit for inhibiting a second operation of the first transmission after a first operation of the first transmission; and
      an automatic shift control unit for automatically generating the transmission commands;
   wherein the automatic shift control unit operates in an automatic mode and in a manual mode;
   wherein the transmission control unit is operatively coupled to a rotation information communication path for receiving information indicating rotation of a rotating member, and wherein, when the automatic transmission control unit operates in the automatic mode, the inhibiting unit inhibits the second operation of the first transmission based on rotation of the rotating member;
   wherein the information indicating rotation of a rotating member comprises rotation indicating signals, and wherein, when the automatic transmission control unit operates in the automatic mode, the inhibiting unit inhibits the second operation of the first transmission until after receiving a first prescribed number of rotation indicating signals.

15. The apparatus according to claim 14 wherein the rotation indicating signals comprise crank rotation indicating signals, and wherein, when the automatic transmission control unit operates in the automatic mode, the inhibiting unit inhibits the second operation of the first transmission until after receiving the first prescribed number of crank rotation indicating signals.

16. The apparatus according to claim 14 wherein, when the automatic shift control unit operates in the automatic mode, the inhibiting unit inhibits the second operation of the first transmission for a prescribed time interval after the first operation of the first transmission.

17. The apparatus according to claim 16 wherein, when the automatic shift control unit operates in the manual mode, the inhibiting unit inhibits the second operation of the first transmission until after a second prescribed number of rotation indicating signals.

18. The apparatus according to claim 17 wherein the first prescribed number of rotation indicating signals is different from the second prescribed number of rotation indicating signals.

19. The apparatus according to claim 18 wherein the first prescribed number of rotation indicating signals is greater than the second prescribed number of rotation indicating signals.

20. An apparatus for controlling a first transmission and a second transmission in a bicycle, wherein the apparatus comprises:
   a transmission control unit that generates transmission commands for controlling the operation of the first transmission and the second transmission;
   wherein the transmission control unit comprises:
      an inhibiting unit for inhibiting a second operation of the first transmission after a first operation of the first transmission; and
      an automatic shift control unit for automatically generating the transmission commands;
   wherein the automatic shift control unit operates in an automatic mode and in a manual mode; and
   wherein, when the automatic shift control unit switches from one of the automatic mode and the manual mode to the other one of the automatic mode and the manual mode, the inhibiting unit inhibits the second operation of the first transmission for a prescribed time interval after the first operation of the first transmission.

21. The apparatus according to claim 20 wherein, when the automatic shift control unit switches from the manual mode to the automatic mode, the inhibiting unit inhibits the second operation of the first transmission for a prescribed time interval after the first operation of the first transmission.

22. An apparatus for controlling a first transmission and a second transmission in a bicycle, wherein the apparatus comprises:
   a transmission control unit that generates transmission commands for controlling the operation of the first transmission and the second transmission;
   wherein the transmission control unit comprises:
      an inhibiting unit for inhibiting a second operation of the first transmission after a first operation of the first transmission; and
      an automatic shift control unit for automatically generating the transmission commands;
   wherein the automatic shift control unit operates in an automatic mode and in a manual mode;
   wherein the transmission control unit is operatively coupled to a rotation information communication path for receiving information indicating rotation of a rotating member, and wherein, when the automatic shift control unit switches from one of the automatic mode and the manual mode to the other one of the automatic mode and the manual mode, the inhibiting unit inhibits the second operation of the first transmission based on rotation of the rotating member.

23. The apparatus according to claim 22 wherein the information indicating rotation of a rotating member comprises rotation indicating signals, and wherein, when the automatic shift control unit switches from one of the automatic mode and the manual mode to the other one of the automatic mode and the manual mode, the inhibiting unit inhibits the second operation of the first transmission until after receiving a prescribed number of rotation indicating signals.

24. The apparatus according to claim 23 wherein the rotation indicating signals comprise crank rotation indicating signals, and wherein, when the automatic shift control unit switches from the manual mode to the automatic mode, the inhibiting unit inhibits the second operation of the first transmission until after receiving the prescribed number of crank rotation indicating signals.

25. The apparatus according to claim 24 wherein, when the automatic shift control unit switches from one of the automatic mode and the manual mode to the other one of the automatic mode and the manual mode, the inhibiting unit inhibits the second operation of the first transmission for a prescribed time interval after the first operation of the first transmission.

26. The apparatus according to claim 25 wherein the rotation indicating signals comprise crank rotation indicating signals, wherein, when the automatic shift control unit switches from the manual mode to the automatic mode, the inhibiting unit inhibits the second operation of the first transmission until after receiving the prescribed number of crank rotation indicating signals, and wherein when the automatic shift control unit switches from the manual mode to the automatic mode, the inhibiting unit inhibits the second operation of the first transmission for a prescribed time interval after the first operation of the first transmission.

27. An apparatus for controlling a first transmission and a second transmission in a bicycle, wherein a difference between a first gear ratio and an adjacent second gear ratio in the first transmission is greater than a difference between a first gear ratio and an adjacent second gear ratio in the second transmission, wherein the apparatus comprises:
   a transmission control unit that generates transmission commands for controlling the operation of the first transmission and the second transmission; and
   wherein the transmission control unit comprises an inhibiting unit for inhibiting a second operation of moving the first transmission from a second origin gear ratio to a second destination gear ratio after a first operation of moving the first transmission from a first origin gear ratio to a first destination gear ratio based on movement of the first transmission from the first origin gear ratio to the first destination gear ratio.

28. An apparatus for controlling a first transmission and a second transmission in a bicycle, wherein the apparatus comprises:
   a transmission control unit that generates transmission commands for controlling the operation of the first transmission and the second transmission;
   a mode switch operatively coupled to the transmission control unit for selecting between a manual and an automatic mode of operation of at least one of the first transmission and the second transmission; and wherein the transmission control unit comprises an inhibiting unit operatively coupled to the mode switch for inhibiting an operation of at least one of the first transmission and the second transmission after operation of the mode switch to select one of the manual and automatic mode of operation.

29. The apparatus according to claim 28 wherein the mode switch comprises a manually operated mode switch.

30. The apparatus according to claim 28 wherein the inhibiting unit inhibits the operation of the at least one of the first transmission and the second transmission for a prescribed time interval after operation of the mode switch.

31. The apparatus according to claim 28 wherein the transmission control unit is operatively coupled to a rotation information communication path for receiving information indicating rotation of a rotating member, and wherein the inhibiting unit inhibits the operation of the at least one of the first transmission and the second transmission based on rotation of the rotating member.

32. The apparatus according to claim 31 wherein the information indicating rotation of the rotating member comprises rotation indicating signals, and wherein the inhibiting unit inhibits the operation of the at least one of the first transmission and the second transmission until after receiving a prescribed number of rotation indicating signals.

33. The apparatus according to claim 32 wherein the rotation indicating signals comprise crank rotation indicating signals, and wherein the inhibiting unit inhibits the operation of the at least one of the first transmission and the second transmission until after receiving the prescribed number of crank rotation indicating signals.

34. The apparatus according to claim 28 wherein the transmission control unit further comprises an automatic shift control unit for automatically generating the transmission commands.

35. The apparatus according to claim 34 wherein the transmission control unit is operatively coupled to a speed communication path for receiving information indicating a bicycle speed, and wherein the transmission control unit automatically generates transmission commands based on bicycle speed.

36. The apparatus according to claim 34 wherein the transmission control unit is operatively coupled to a rotation information communication path for receiving information indicating rotation of a rotating member, and wherein, when the transmission control unit switches to the manual mode, the inhibiting unit inhibits the operation of the at least one of the first transmission and the second transmission based on rotation of the rotating member.

37. The apparatus according to claim 36 wherein the information indicating rotation of a rotating member comprises rotation indicating signals, and wherein, when the transmission control unit operates in the manual mode, the inhibiting unit inhibits the operation of the at least one of the first transmission and the second transmission until after receiving a prescribed number of rotation indicating signals.

38. The apparatus according to claim 37 wherein the rotation indicating signals comprise crank rotation indicating signals, and wherein, when the transmission control unit operates in the manual mode, the inhibiting unit inhibits the operation of the at least one of the first transmission and the second transmission until after receiving the prescribed number of crank rotation indicating signals.

39. The apparatus according to claim 34 wherein, when the transmission control unit operates in the automatic mode, the inhibiting unit inhibits the operation of the at least one of the first transmission and the second transmission for a prescribed time interval after operation of the mode switch.

40. The apparatus according to claim 34 wherein the transmission control unit is operatively coupled to a rotation information communication path for receiving information indicating rotation of a rotating member, and wherein, when the transmission control unit operates in the automatic mode, the inhibiting unit inhibits the operation of the at least one of the first transmission and the second transmission based on rotation of the rotating member.

41. The apparatus according to claim 40 wherein the information indicating rotation of a rotating member comprises rotation indicating signals, and wherein, when the transmission control unit operates in the automatic mode, the inhibiting unit inhibits the operation of the at least one of the first transmission and the second transmission until after receiving a first prescribed number of rotation indicating signals.

42. The apparatus according to claim 41 wherein the rotation indicating signals comprise crank rotation indicating signals, and wherein, when the transmission control unit operates in the automatic mode, the inhibiting unit inhibits the operation of the at least one of the first transmission and the second transmission until after receiving the first prescribed number of crank rotation indicating signals.

43. The apparatus according to claim 41 wherein, when the transmission control unit operates in the automatic mode, the inhibiting unit inhibits the operation of the at least one of the first transmission and the second transmission for a prescribed time interval after operation of the mode switch.

44. The apparatus according to claim 43 wherein, when the transmission control unit operates in the manual mode, the inhibiting unit inhibits the operation of the at least one of the first transmission and the second transmission until after a second prescribed number of rotation indicating signals.

45. The apparatus according to claim 44 wherein the first prescribed number of rotation indicating signals is different from the second prescribed number of rotation indicating signals.

46. The apparatus according to claim 45 wherein the first prescribed number of rotation indicating signals is greater than the second prescribed number of rotation indicating signals.

47. The apparatus according to claim 34 wherein the transmission control unit is operatively coupled to a rotation information communication path for receiving information indicating rotation of a rotating member, and wherein, when the transmission control unit switches from one of the automatic mode and the manual mode to the other one of the automatic mode and the manual mode, the inhibiting unit inhibits the operation of the at least one of the first transmission and the second transmission based on rotation of the rotating member.

48. The apparatus according to claim 47 wherein the information indicating rotation of a rotating member comprises rotation indicating signals, and wherein, when the transmission control unit switches from one of the automatic mode and the manual mode to the other one of the automatic mode and the manual mode, the inhibiting unit inhibits the operation of the at least one of the first transmission and the second transmission until after receiving a prescribed number of rotation indicating signals.

49. The apparatus according to claim 48 wherein the rotation indicating signals comprise crank rotation indicating signals, and wherein, when the transmission control unit switches from the manual mode to the automatic mode, the inhibiting unit inhibits the operation of the at least one of the first transmission and the second transmission until after receiving the prescribed number of crank rotation indicating signals.

50. The apparatus according to claim 48 wherein, when the transmission control unit switches from one of the automatic mode and the manual mode to the other one of the automatic mode and the manual mode, the inhibiting unit inhibits the operation of the at least one of the first transmission and the second transmission for a prescribed time interval after the operation of the mode switch.

51. The apparatus according to claim 50 wherein the rotation indicating signals comprise crank rotation indicating signals, wherein, when the transmission control unit switches from the manual mode to the automatic mode, the inhibiting unit inhibits the operation of the at least one of the first transmission and the second transmission until after receiving the prescribed number of crank rotation indicating signals, and wherein when the transmission control unit switches from the manual mode to the automatic mode, the inhibiting unit inhibits the operation of the at least one of the first transmission and the second transmission for a prescribed time interval after the operation of the mode switch.

* * * * *